United States Patent
Chestine

(10) Patent No.: US 12,434,845 B2
(45) Date of Patent: Oct. 7, 2025

(54) MODULAR HEAT EXCHANGER SYSTEMS

(71) Applicant: THE BOEING COMPANY, Arlington, VA (US)

(72) Inventor: Ralph E. Chestine, Monroe, WA (US)

(73) Assignee: The Boeing Company, Alexandria, VA (US)

( * ) Notice: Subject to any disclaimer, the term of this patent is extended or adjusted under 35 U.S.C. 154(b) by 335 days.

(21) Appl. No.: 18/169,910

(22) Filed: Feb. 16, 2023

(65) Prior Publication Data

US 2024/0278921 A1    Aug. 22, 2024

(51) Int. Cl.
*B64D 13/08*    (2006.01)
*B64D 13/06*    (2006.01)

(52) U.S. Cl.
CPC ...... *B64D 13/08* (2013.01); *B64D 2013/0618* (2013.01); *B64D 2013/0651* (2013.01); *B64D 2013/0674* (2013.01)

(58) Field of Classification Search
CPC ............ B64D 13/08; B64D 2013/0618; B64D 2013/0615; B64D 2013/0674
See application file for complete search history.

(56) References Cited

U.S. PATENT DOCUMENTS

| | | | | |
|---|---|---|---|---|
| 2,729,433 | A * | 1/1956 | Berg | F28F 27/02 165/145 |
| 3,208,234 | A | 9/1965 | Messinger | |
| 11,161,621 | B2 | 11/2021 | Turney | |
| 2013/0037234 | A1 * | 2/2013 | Mackin | B64D 13/08 165/41 |
| 2021/0092875 | A1 * | 3/2021 | Hellmann-Regen | H05K 7/20745 |

FOREIGN PATENT DOCUMENTS

| | | | | |
|---|---|---|---|---|
| CN | 106323079 | | 1/2017 | |
| EP | 3591328 | | 1/2020 | |
| EP | 3591328 | A1 * | 1/2020 | ............ B60K 11/04 |
| EP | 4012321 | | 6/2022 | |
| WO | WO 2008/010418 | | 1/2008 | |

OTHER PUBLICATIONS

Extended European Search Report for EP 23211979.2-1002, dated Apr. 26, 2024.
English translation of CN 106323079.

* cited by examiner

*Primary Examiner* — Elizabeth J Martin
(74) *Attorney, Agent, or Firm* — Joseph M. Butscher; The Small Patent Law Group LLC

(57) ABSTRACT

A heat exchanger system and method includes a securing frame, a heat transfer core having heat transfer panels removably secured to the securing frame, the heat transfer panels optionally including a plurality of segment modules coupled together, and one or more filter screens removably secured to the securing frame at one or both of an inlet end or an outlet end. The heat transfer core is disposed between the inlet end and the outlet end.

21 Claims, 7 Drawing Sheets

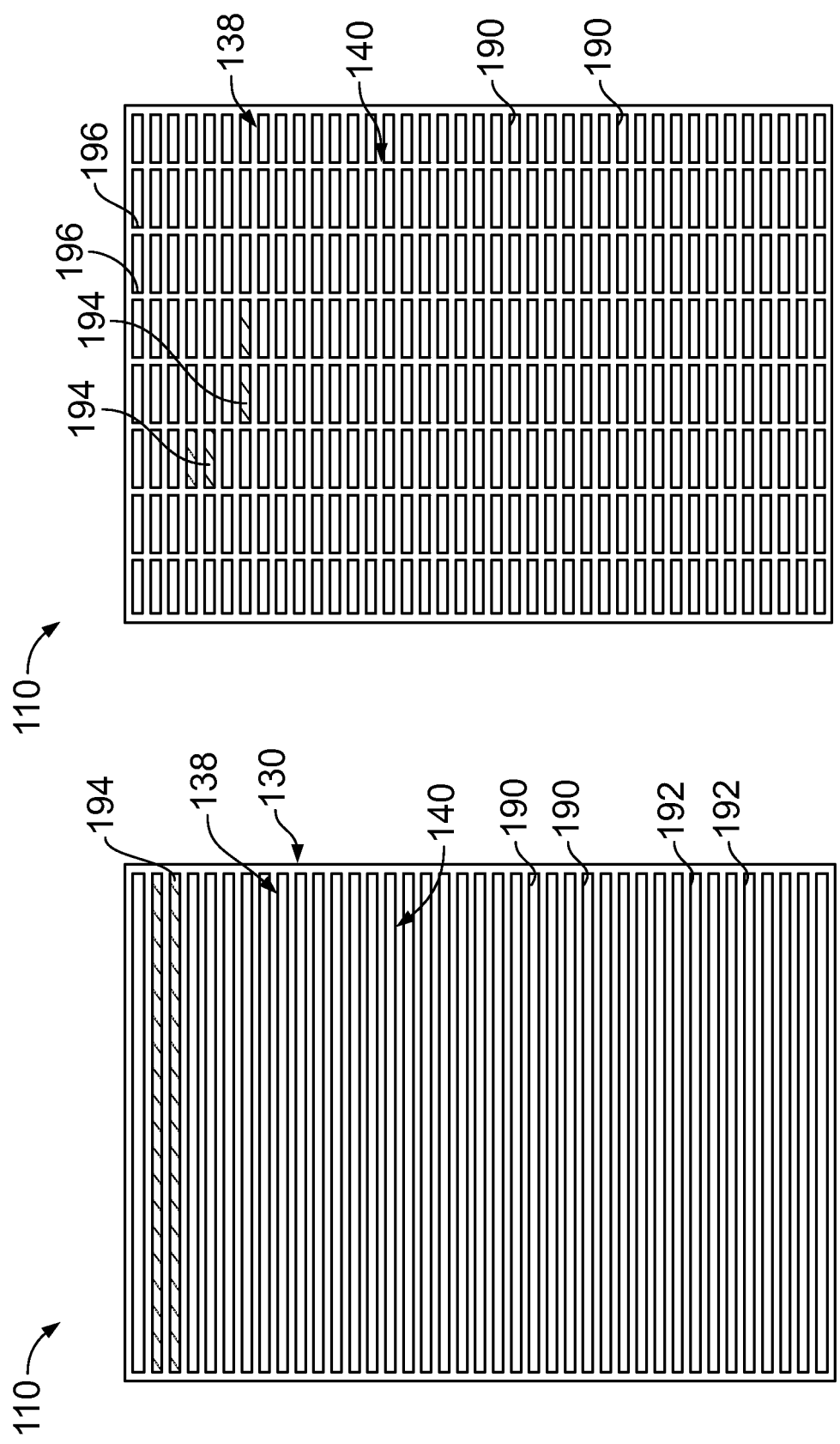

MODULAR HEAT EXCHANGER SYSTEMS

FIELD OF THE DISCLOSURE

Examples of the present disclosure generally relate to modular heat exchanger systems, such as can be used with various types of vehicles.

BACKGROUND OF THE DISCLOSURE

Heat exchangers (HXs) are used to transfer heat between a source and a fluid, such as a gas or a liquid. Heat exchangers can be used in various settings, such as in heating, ventilation, and air conditioning (HVAC), refrigeration and cooling systems, vehicles, and the like.

In an example, a commercial aircraft can include several heat exchangers, such as can be used for engine bleed air cooling, air-conditioning heat exchange with an external ram air system, hydraulic-to-fuel heat exchange, engine oil heat exchange, electrical component heat exchange, cabin air cooling heat exchange, and the like. A typical heat exchanger includes an inlet end and an outlet or exit end for each separated fluid being heated and cooled. However, it has been found that some HX inlets may be susceptible to corrosion and foreign object debris (for example, organic material, such as insects, pollens, etc.) being deposited thereon and/or therein depending on the source of the inlet fluid and design of the heat exchanger. Certain heat exchangers may need to be entirely replaced due to such corrosion and/or foreign object debris, replaced, or removed for cleaning.

As can be appreciated, the process of replacing a heat exchanger, such as within a commercial aircraft, can be expensive, time-consuming, and labor-intensive. Additionally, if additional heat management is required, a different heat exchanger may be needed.

SUMMARY OF THE DISCLOSURE

A need exists for a heat exchanger that is configured to reduce costs due to damage such as corrosion, particularly at an inlet. Further, a need exists for a heat exchanger that protects against foreign object debris and the impact hereof while allowing for a quick and cost effective cleaning capability. Additionally, a need exists for a heat exchanger that can be quickly and easily modified, instead of being removed and replaced due to damage, cleaning, or additional future heat removal requirements.

With those needs in mind, certain examples of the present disclosure provide a heat exchanger system, including a securing frame, a heat transfer core secured to the securing frame, and one or more filter screens secured to the securing frame at one or both of an inlet end or an outlet end. The heat transfer core is disposed between the inlet end and the outlet end. The heat transfer core can be divided into modules, with the inlet end and the outlet end potentially being separate modules that are distinct from the heat transfer core.

In at least one example, the heat transfer core includes heat transfer panels. As a further example, the heat transfer panels are removably coupled to the securing frame. The heat transfer panels can include fluid passages in fluid communication to form a fluid circuit that extends between a fluid inlet and a fluid outlet. The heat transfer panels can include heat transfer fins and other surfaces separated by fluid channels. In at least one example, each of the heat transfer panels includes a plurality of segment modules removably coupled together. The heat transfer panels may be devoid of guard fins.

In at least one example, the one or more filter screens are removably coupled to the securing frame. The one or more filter screens include a protective barrier within a protective opening. As an example, the protective barrier includes rigid cross beams spaced apart by openings. As a further example, the protective barrier further includes a wire mesh screen extending between the cross beams. As another example, the protective barrier further includes columns that intersect the cross beams.

In at least one example, the one or more filter screens include an inlet filter screen at the inlet end. As a further example, the one or more filter screens further include an outlet filter screen at the outlet end. In at least one example, the one or more filter screens are spaced apart from the heat transfer core.

As an example, the heat exchanger system is in fluid communication with a RAM air cooling system of an aircraft.

Certain examples of the present disclosure provide an aircraft including a RAM air cooling system, and a heat exchanger system in fluid communication with the RAM air cooling system, as described herein.

Certain examples of the present disclosure provide a method for a heat exchanger system. The method includes removably securing heat transfer panels of a heat transfer core to a securing frame; and removably securing one or more filter screens to the securing frame at one or both of an inlet end or an outlet end, wherein the heat transfer core is disposed between the inlet end and the outlet end.

BRIEF DESCRIPTION OF THE DRAWINGS

FIG. 8 illustrates a front view of a filter screen, according to an example of the present disclosure.

FIG. 9 illustrates a front view of a filter screen, according to an example of the present disclosure.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
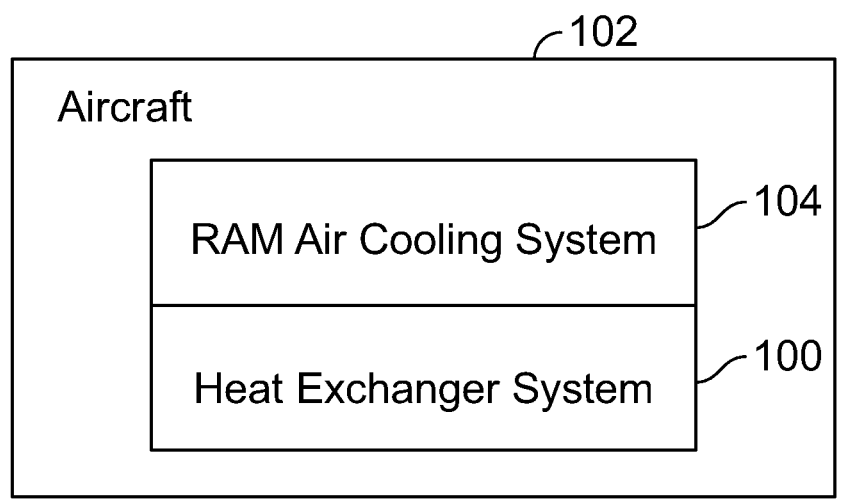
FIG. 1 illustrates a block diagram of a heat exchanger system of an aircraft, according to an example of the present disclosure.

FIG. 1 illustrates a block diagram of a heat exchanger system 100 of an aircraft 102, according to an example of the present disclosure. In at least one example, the heat exchanger system 100 is a liquid-to-gas heat exchanger system. As another example, the heat exchanger system 100 is a liquid-to-liquid heat exchanger system. As another example, the heat exchanger system 100 is a gas-to-gas heat exchanger system. In at least one example, a liquid coolant circulates through a core of the heat exchanger system 100. The liquid coolant can be a refrigerant, such as glycol. As another example, the liquid coolant can be water. In at least one example, the liquid coolant circulates through the fluid circuit of the heat exchanger system 100, and transfer heat energy with air that passes through the heat exchanger system 100, such as from and between an air inlet and an air outlet.

In at least one example, the heat exchanger system 100 is disposed within a liquid cooling system of the aircraft 102. For example, the heat exchanger system 100 can circulate a liquid coolant that is configured to remove heat generated by high voltage direct current (DC) equipment within the aircraft. In at least one example, the heat exchanger system 100 is in fluid communication with a RAM air cooling system 104 of the aircraft 102. The RAM air cooling system 104 can be part of an environmental control system (ECS) of the aircraft 102. The RAM air cooling system 104 can be underneath a fuel tank of the aircraft 102, and is configured to draw in RAM air from outside of the aircraft 102. The heat exchanger system 100 uses the RAM air drawn into the aircraft 102 by the RAM air cooling system 104 as a heat sink.

The RAM air cooling system 104 can include RAM air inlet ducting. Air flow into and through the inlet ducting allows for air movement through the ducting and into a RAM inlet header, and then into the two heat exchanger inlets, through heat transfer cores, then heat exchanger outlets, and followed by air movement through another heat exchanger inlet header, core and then outlet. A RAM ducting exit header can have an electric fan. In at least one example, air flows around the fan in flight, through the fan on ground, and then exiting the RAM ducting through the exit ducting, which can be just forward of main landing gear fairing doors. It is to be understood that such a RAM air cooling system is an example, and is not limiting.

Optionally, the heat exchanger system 100 can be used with various other systems of the aircraft 102. For example, the heat exchanger system 100 can be disposed within an engine of the aircraft 102. As another example, the heat exchanger system 100 can be used within a galley of the aircraft, such as to provide heat transfer with one or more ovens, refrigerator, and/or cold cars. As another example, the heat exchanger system 100 can be used to provide heat transfer with one or more computing and/or processing systems within the aircraft 102.

The heat exchanger system 100 can be used with various other vehicles, other than aircraft, such as trains and ships. As another example, the heat exchanger system 100 can be used with fixed structures, such as residential or commercial buildings.

As described herein, examples of the present disclosure provide unitized or modular systems and methods that allow for expansion of heat exchangers when additional heat removal is desired, and allow for replacement of damaged section without disposal or repair of an entire heat exchanger system.

As described herein, in at least one example, filter screens can be altered to allow for uniform flow through the heat exchanger system 100 by altering a design of screen mesh and/or adding louvers, or similar inlet/outlet configurations. The filter screens can also be configured as structural elements between a frame and the heat exchanger core. Heat exchanger systems can use guard fins as protective structure for heat transfer fins. By adding a filter element, such structural protection can be moved to the filter screen, thereby simplifying the design of the heat transfer core. The filters can be removed when removing modules to protect the heat transfer fins, while also being removed separately for easy cleaning, for example.

Figure 2:
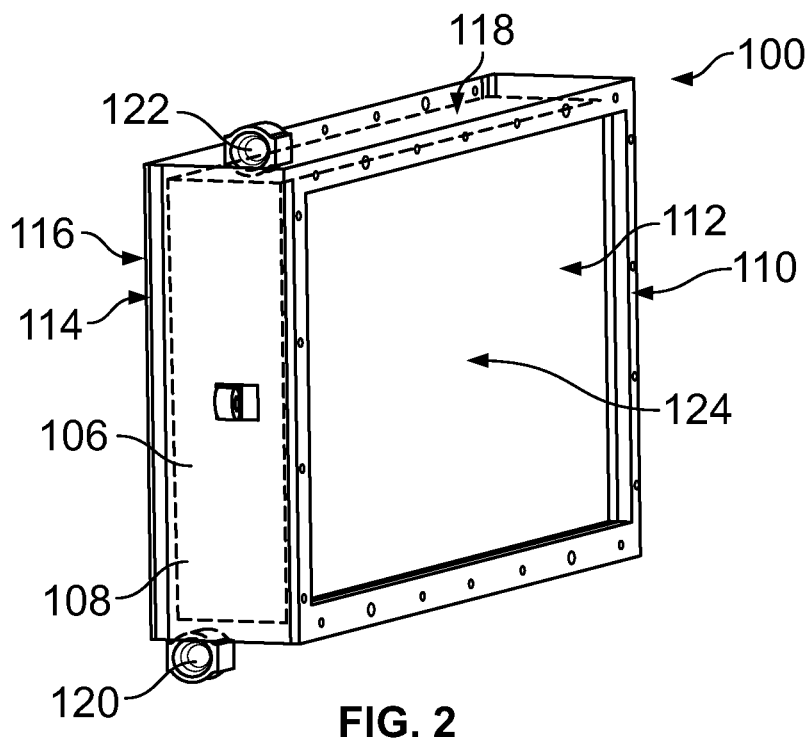
FIG. 2 illustrates an isometric view of the heat exchanger system, according to an example of the present disclosure.

FIG. 2 illustrates an isometric view of the heat exchanger system 100, according to an example of the present disclosure. The view shown in FIG. 2 can be a front view, a rear view, a lateral view, a top view, a bottom view, or the like, depending on a desired orientation and application. The heat exchanger system 100 includes a securing frame 106, such as a housing, that includes coupling walls 108. The coupling walls 108 securely connect to an inlet filter screen 110 at an inlet end 112, an outlet filter screen 114 at an outlet end 116, and a heat transfer core 118 disposed between the inlet end 112 and the outlet end 116. A fluid inlet 120 secures to the heat transfer core 118 at a first side, end, or the like, and a fluid outlet 122 secures to the heat transfer core 118 at a second side, end, or the like. The fluid inlet 120 allows a heat transfer fluid, such as a liquid refrigerant, to pass into and circulate through the heat transfer core 118, and the fluid outlet 122 allows the heat transfer fluid to pass out of the heat transfer core 118, such as back to a source.

In operation, the heat exchanger system 100 receives a cooling fluid 124, such as RAM air, at the inlet end 112. The cooling fluid 124 passes through the inlet filter screen 110, which prevents foreign object debris from entering into the heat transfer core 118, and can also provide structural support to the securing frame 106, heat transfer core 118, and the like. The inlet filter screen 110 also provides a protective barrier to heat transfer fins. As the cooling fluid 124 passes into the heat transfer core 118, heat energy is transferred from the heat transfer fluid circulating through the heat transfer core 118 to the cooling fluid 124. As such, the cooling fluid 124 has a higher temperature after passing out of the outlet end 116 as compared to when the cooling fluid 124 enters the inlet end 112. Conversely, the heat transfer fluid is cooled by the cooling fluid 124, and has a lower temperature at the fluid outlet 122, as compared to the fluid inlet 120.

The heat transfer core 118, the inlet filter screen 110, and the outlet filter screen 114 are configured to removably couple to the securing frame 106. For example, the heat transfer core 118, the inlet filter screen 110, and the outlet filter screen 114 are configured to be slidably, snapably, latchably, or otherwise removably secured to the securing frame 106. In this manner, if a portion of the heat exchanger system 100 is to be replaced, such portion is simply removed from the securing frame 106, and replaced. As an example, the inlet filter screen 110 can be removed from the securing frame 106 and cleaned with water or compressed air, for example, to remove foreign object debris. After the inlet filter screen 110 is cleaned, the inlet filter screen 110 can be re-secured to the securing frame 106. As another example, one or more portions of the heat transfer core 118 can be quickly and easily removed and replaced, as desired. Optionally, the heat exchanger system 100 may not include the outlet filter screen 114.

Further, additional components can be modularly added to the heat exchanger system 100. For example, the heat transfer core 118 includes a plurality of heat transfer panels. Heat transfer panels can be selectively added or removed from the securing frame 106. In this manner, if a larger (or smaller) heat exchanger system 100 is desired, the various components can be selectively added (or removed) to the heat exchanger system 100, instead of removing the entire heat exchanger system 100 and replacing with an entirely different heat exchanger.

Figure 3:
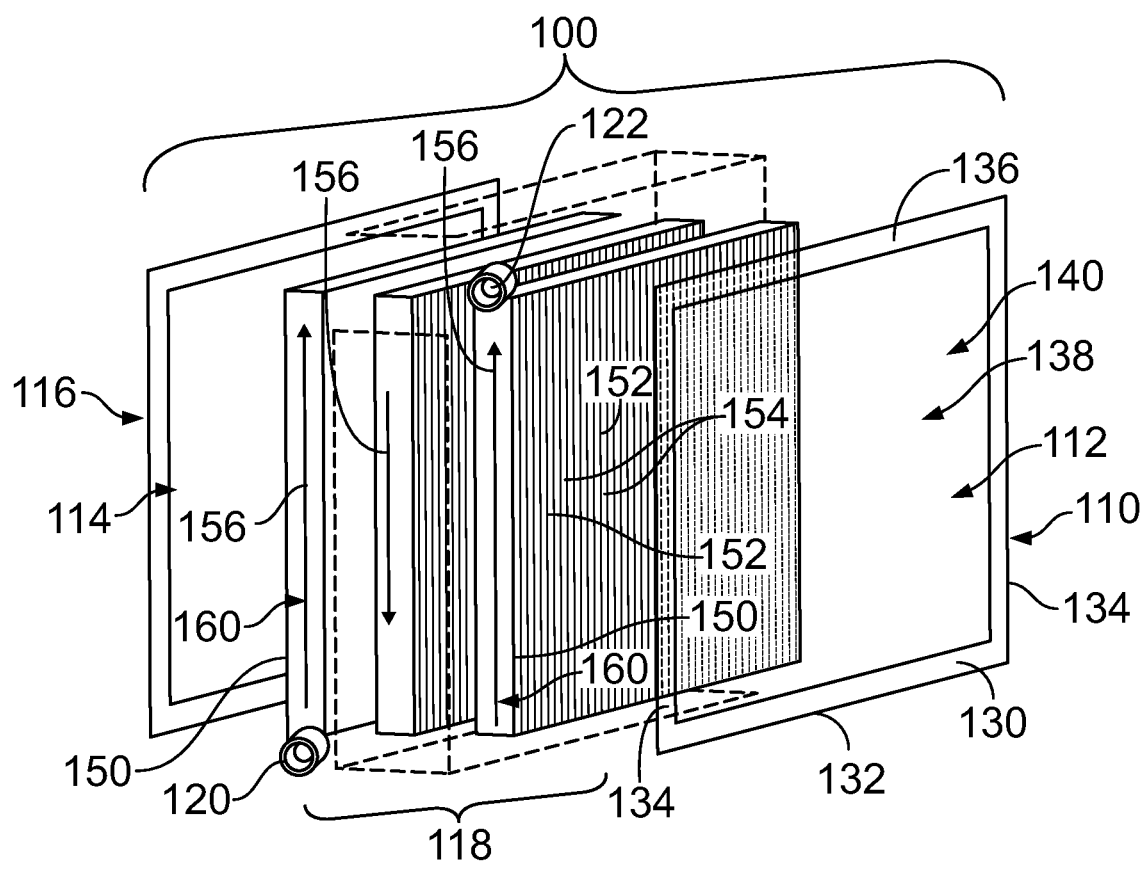
FIG. 3 illustrates an isometric exploded view of the heat exchanger system of FIG. 2.

FIG. 3 illustrates an isometric exploded view of the heat exchanger system 100 of FIG. 2. For the sake of clarity, the securing frame 106 (shown in FIG. 2) is now shown in FIG. 3. The inlet filter screen 110 includes an outer frame 130 including a lower segment 132, side segments 134, and an upper segment 136, defining a protective opening 138 therebetween. A protective barrier 140 extends within the protective opening 138 between the lower segment 132, the side segments 134, and the upper segment 136. The protective barrier 140 includes one or more of a metallic (such as aluminum, stainless steel, or the like) or composite mesh, metallic or composite cross beams, and/or metallic or composite columns. The protective barrier 140 blocks foreign object debris from passing into the heat transfer core 118, and causing corrosion thereon or therein. The outlet filter screen 114 can include similar elements (such as a protective barrier within a protective outlet opening) as the inlet filter screen 110. In at least one other example, the heat exchanger system 100 does not include the outlet filter screen 114.

The securing frame 106 (shown in FIG. 2) can be removably attached to various portions of the inlet end 112, the heat transfer core 118, the outlet end 116, and/or heat transfer panels 150, such as via snapable connections or the like, thereby joining together the system, which can be disposed within a larger assembly, for example. In stark contrast, typical known heat exchangers are brazed together with all portions forming a single assembly, which is both complex to manufacture, and expensive to maintain over time as parts can wear out due to corrosion, foreign object debris impacts, handling and cleaning damage, or other wear.

Referring to FIGS. 2 and 3, the outer frame 130 is configured to removably secure to the securing frame 106. For example, the outer frame 130 can be configured to slidably couple to reciprocal slots formed in to the securing frame 106.

The heat transfer core 118 includes one or more heat transfer panels 150. The heat transfer panels 150 are configured to removably couple to the securing frame 106, such as by sliding into and out of reciprocal slots formed in the securing frame 106. Each of the heat transfer panels 150 includes a plurality of heat transfer fins 152 separated by fluid channels 154. Additionally, fluid passages 156 are formed within the heat transfer panels 150. The fluid passages 156 of the heat transfer panels 150 are in fluid communication to form a fluid circuit 160 that extends between the fluid inlet 120 and the fluid outlet 122.

The cooling fluid 124 (such as air) passes through the inlet filter screen 110, which prevents foreign object debris from passing into the heat transfer core 118. As the cooling fluid 124 passes into the heat transfer core 118, the cooling fluid 124 passes into and through the fluid channels 154 between the heat transfer fins 152. The fluid passages 156 circulate a liquid coolant, such as a refrigerant, which exchanges energy with the cooling fluid 124.

As shown, the heat transfer core 118 can include a plurality of heat transfer panels 150 coupled together. Each of the heat transfer panels 150 can be selectively removed from the securing frame 106. In this manner, a damaged heat transfer panel 150 can be removed and replaced without the other heat transfer panels 150 being removed. As another example, additional heat transfer panels 150 can be modularly added to the securing frame 106. A different securing frame 106 can be used to accommodate a greater number of heat transfer panels 150. As described herein, the heat exchanger system 100 provides a modular system that allows for various components, such as the heat transfer panels 150, the inlet filter screen 110, and the outlet filter screen 114, to be removed, replaced, removed, and/or added, as desired without changing other portions thereof. As such, the heat exchanger system 100 provides an adaptable assembly that can be modularly adapted to accommodate changing needs, and easy maintenance (in contrast to replacing an entire heat exchanger).

As described herein, the heat exchanger system 100 includes the securing frame 106, the heat transfer core 118 secured to the securing frame 106, and one or more filter screens (such as the inlet filter screen 110 and/or the outlet filter screen 114) secured to the securing frame 106 at one or both of the inlet end 112 and/or the outlet end 116. The heat transfer core 118 is disposed between the inlet end 112 and the outlet end 116. In at least one example, the heat transfer core 118 includes heat transfer panels 150. As a further example, the heat transfer panels 150 are removably coupled to the securing frame 106. In at least one example, the one or more filter screens (such as the inlet filter screen 110 and/or the outlet filter screen 114) are removably coupled to the securing frame 106.

Figure 4:
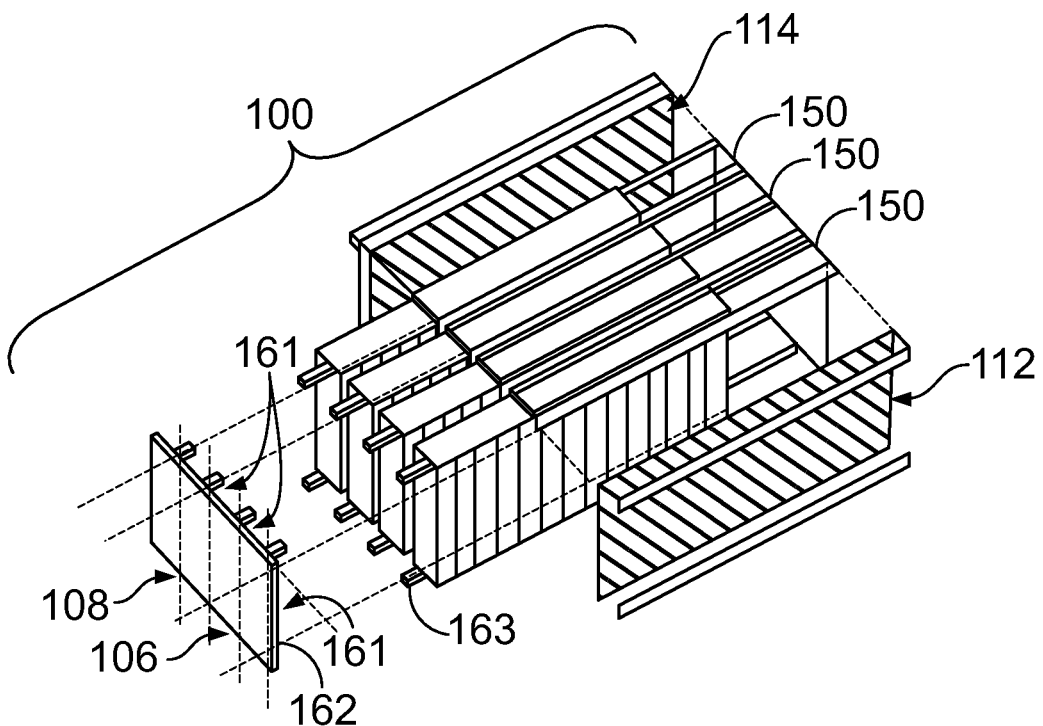
FIG. 4 illustrates an isometric exploded top view of the heat exchanger, according to an example of the present disclosure.

FIG. 4 illustrates an isometric exploded top view of the heat exchanger system 100, according to an example of the present disclosure. In at least one example, the securing frame 106 includes a coupling wall 108 having a plurality of coupling portions 161, such as slots, sockets, and/or the like, that are configured to receive and removably retain various portions of the heat exchanger system 100, such as the inlet filter screen 110, the outlet filter screen 114, and the heat transfer panels 150. The coupling wall 108 can also include a fluid manifold 162 that is configured to sealingly and fluidly couple with one or more fluid couplers 163 of the heat transfer panels 150.

Figure 5:
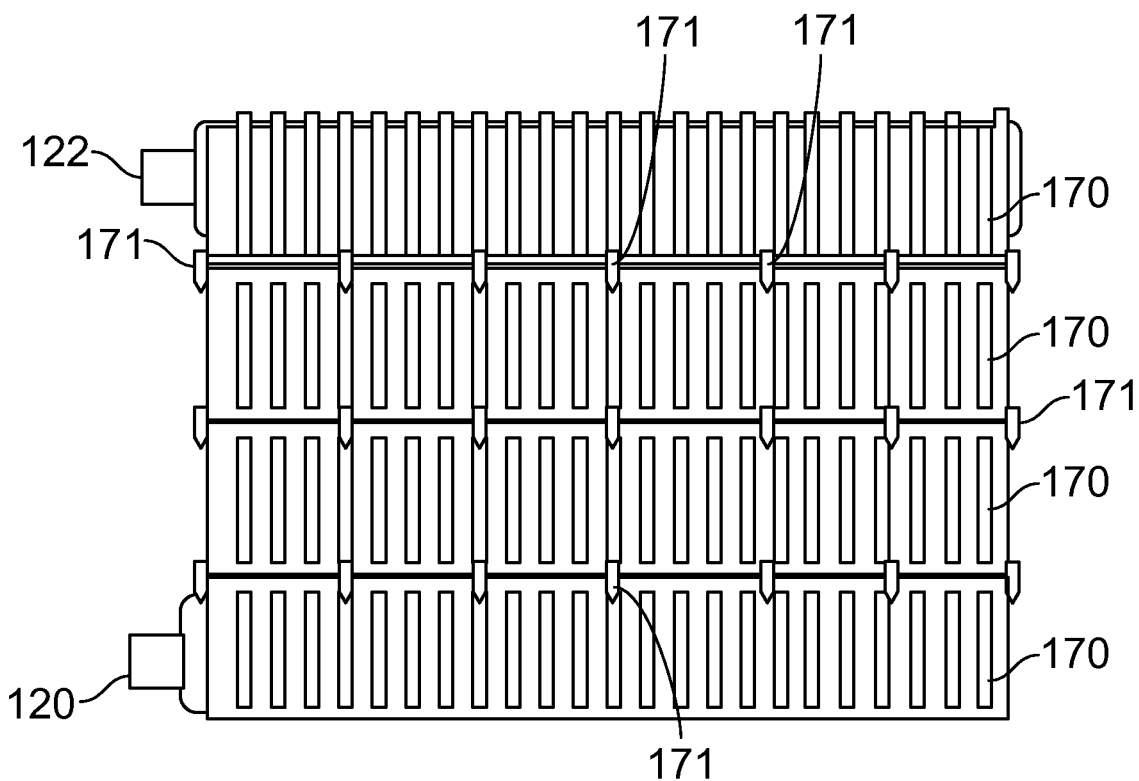
FIG. 5 illustrates a front view of a heat transfer panel, according to an example of the present disclosure.

FIG. 5 illustrates a front view of a heat transfer panel 150, according to an example of the present disclosure. The heat transfer panel 150 can include one or both of the fluid inlet 120 or the fluid outlet 122. The heat transfer panel 150 is formed by a plurality of segment modules 170 that removably couple together. For example, the segment modules 170 can be configured to stack on top of one another, such as via snapable, latchable, or otherwise removable couplings 171. The segment modules 170 couple together to form aligned and sealed connections between the fluid passages.

As shown, four or more segment modules 170 can be aligned together to provide the heat transfer panel 150. Optionally, the heat transfer panel 150 can include more or less segment modules 170, such as two, three, five, six, or more segment modules 170. In this manner, the heat transfer panels 150 can be modularly assembled to a desired size and shape. Further, if one of the segment modules 170 malfunctions, only that particular segment module 170 can be removed and replaced, instead of an entire heat transfer panel 150 being discarded.

Figure 6:
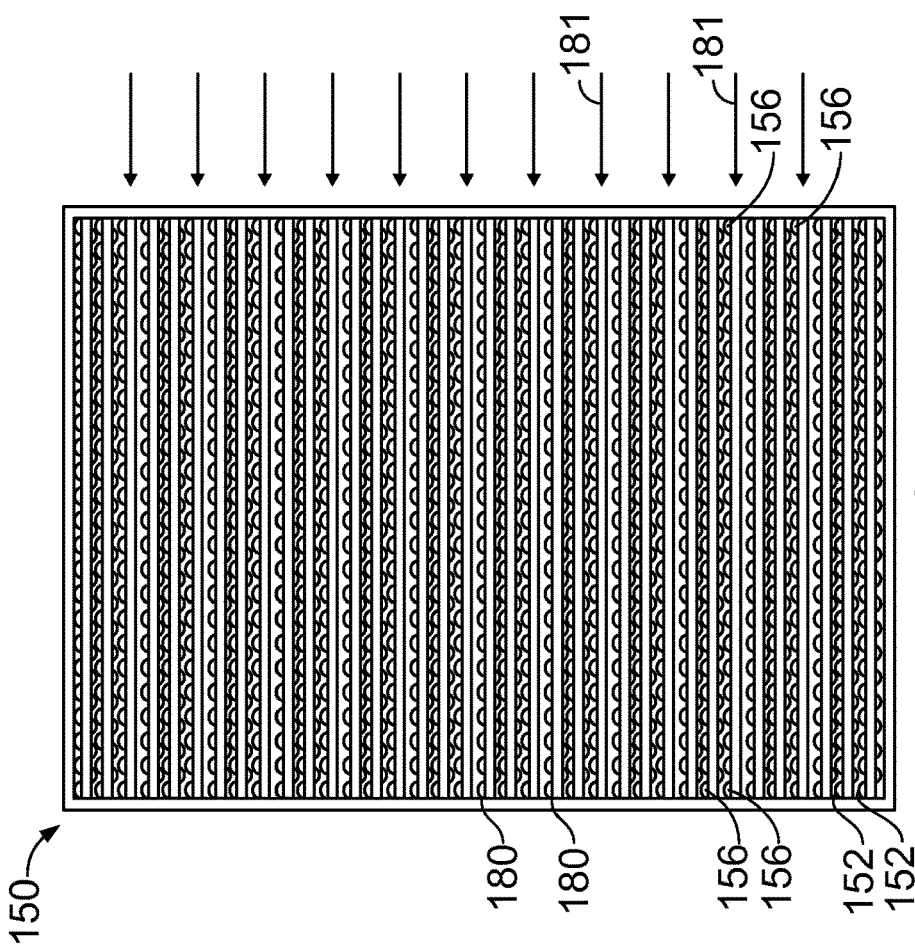
FIG. 6 illustrates a front view of a heat transfer panel, according to an example of the present disclosure.

FIG. 6 illustrates a front view of a heat transfer panel 150, according to an example of the present disclosure. The heat transfer panel 150 includes a plurality of the heat transfer fins 152 separated by fluid channels 156. The heat transfer fins 152 can be ruffle fins, and include waved sheets that extend across the heat transfer panel 150. The heat transfer fins 152 can be formed of metal, such as aluminum. A plurality of guard fins 180 can extend across the heat transfer panel 150. The guard fins 180 can be disposed on and/or spaced from opposite faces of the heat transfer fins 152. The guard fins 180 can be rigid metal beams that provide protective barriers to the heat transfer fins 152. Optionally, the heat transfer panel 150 may not include the guard fins 180. That is, the heat transfer panel 150 can be devoid of guard fins. Instead, the guard fins 180 can be disposed on the inlet filter screen 110 and/or the outlet filter screen 114, thereby providing protection to the heat transfer panel 150 and reducing the material and cost of having such components on the heat transfer panel 150 itself. Fluid passages 156 also extend through the heat transfer panel 150, and are configured to receive and circulate the heat transfer fluid 181.

Figure 7:
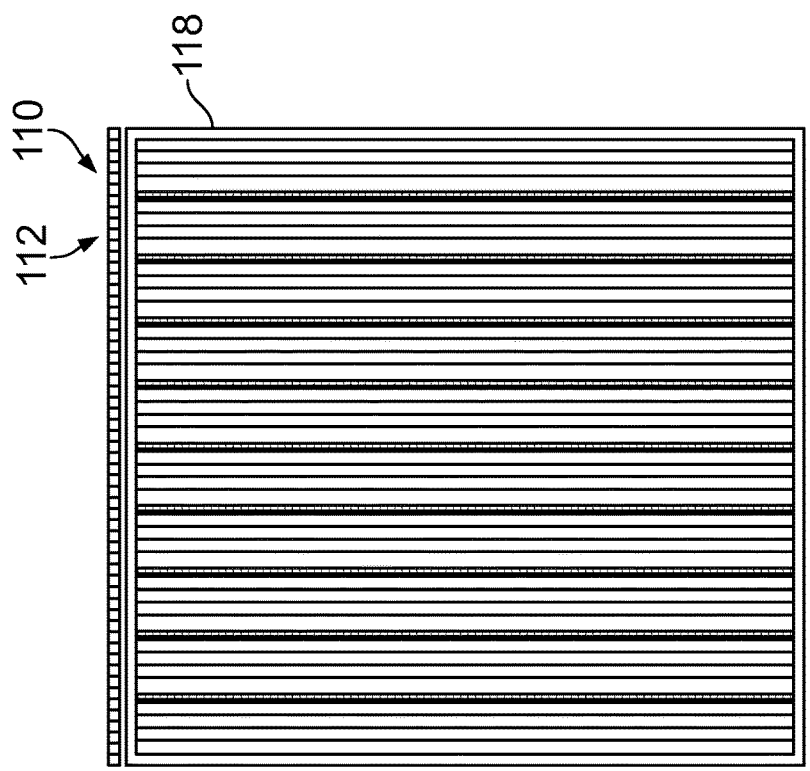
FIG. 7 illustrates a top view of a heat transfer core in relation to an inlet filter screen, according to an example of the present disclosure.

FIG. 7 illustrates a top view of a heat transfer core 118 in relation to the inlet filter screen 110, according to an example of the present disclosure. As shown, the inlet filter screen 110 is spaced apart from the heat transfer core 118. The inlet filter screen 110 is configured to removably secure to the securing frame 106, but may not contact any portion of the heat transfer core 118. The inlet filter screen 110 is separate and distinct from the heat transfer panels 150. The inlet filter screen 110 is secured at the inlet end 112 in front of the heat transfer core 150. Air that passes into the heat exchanger system 100 first encounters the inlet filter screen 110 before passing into the heat transfer core 118. As such, the inlet filter screen 110 provides a protective barrier that prevents, minimizes, or otherwise reduces the potential of foreign object debris from passing into the heat transfer core 118.

FIG. 8 illustrates a front view of a filter screen, according to an example of the present disclosure. The filter screen can be the inlet filter screen 110. The outlet filter screen 114 can be configured the same.

The inlet filter screen 110 includes the outer frame 130 defining the protective opening 138 therebetween. The protective barrier 140 extends within the protective opening 138, and includes a plurality of rigid cross beams 190 spaced apart by openings 192. The cross beams 190 can be formed of a metal, such as aluminum or stainless steel, or a composite material. The cross beams 190 are examples of guard fins. In at least one example, wire mesh screen 194 can also extend between the cross beams 190. Optionally, the inlet filter screen 110 may not include the wire mesh screen 194.

FIG. 9 illustrates a front view of a filter screen, according to an example of the present disclosure. The filter screen can be the inlet filter screen 110. The outlet filter screen 114 can be configured the same.

In this example, the protective barrier 140 also includes metallic or composite columns 196 that intersect the cross beams 190. The cross beams 190 and columns 196 are examples of guard fins. In at least one example, wire mesh screen 194 can also extend between the cross beams 190 and the columns 196. Optionally, the inlet filter screen 110 may not include the wire mesh screen 194.

The filter screen can be configured differently than shown. The filter screens shown in FIGS. 8 and 9 are merely examples.

Referring to FIGS. 1-9, examples of the present disclosure provide a modular heat exchanger system 100 that includes one or more filter screens, such as the inlet filter screen 110 and/or the outlet filter screen 114. The filter screens provide protective barriers, such as can include guard fins (for example, rigid cross beams, columns), and protective wire mesh. The components of the heat exchanger system 100, such as the inlet filter screen 110, the outlet filter screen 114, and the heat transfer panels 150, are configured to be selectively removably coupled to a housing, such as the securing frame 106. For example, the various components can be slidably, latchably, or snapably secured to the securing frame 106. The heat exchanger system 100 can be configured and reconfigured as desired, and can be securely installed within an environment, such as within the aircraft 102. The heat exchanger system 100 can be configured as desired within a particular environment, or built as desired by a manufacturer.

The heat exchanger system 100 has component parts that can be stacked, aligned, fastened, joined and/or mounted together. The modular components of the heat exchanger system 100 allow for quick and easy replacement and/or repair of particular portions without discarding the entire heat exchanger system 100. The modular nature of the heat exchanger system 100 allows for adaptability to remove or add heat, as desired.

The modular heat exchanger system 100 allows for additional heat transfer panels 150 to be added based on demand for additional heat loads without entirely new heat exchangers being designed and qualified for use. The heat exchanger system 100 can be used in various environments, whether on or within vehicles, fixed structures, or the like.

Figure 10:
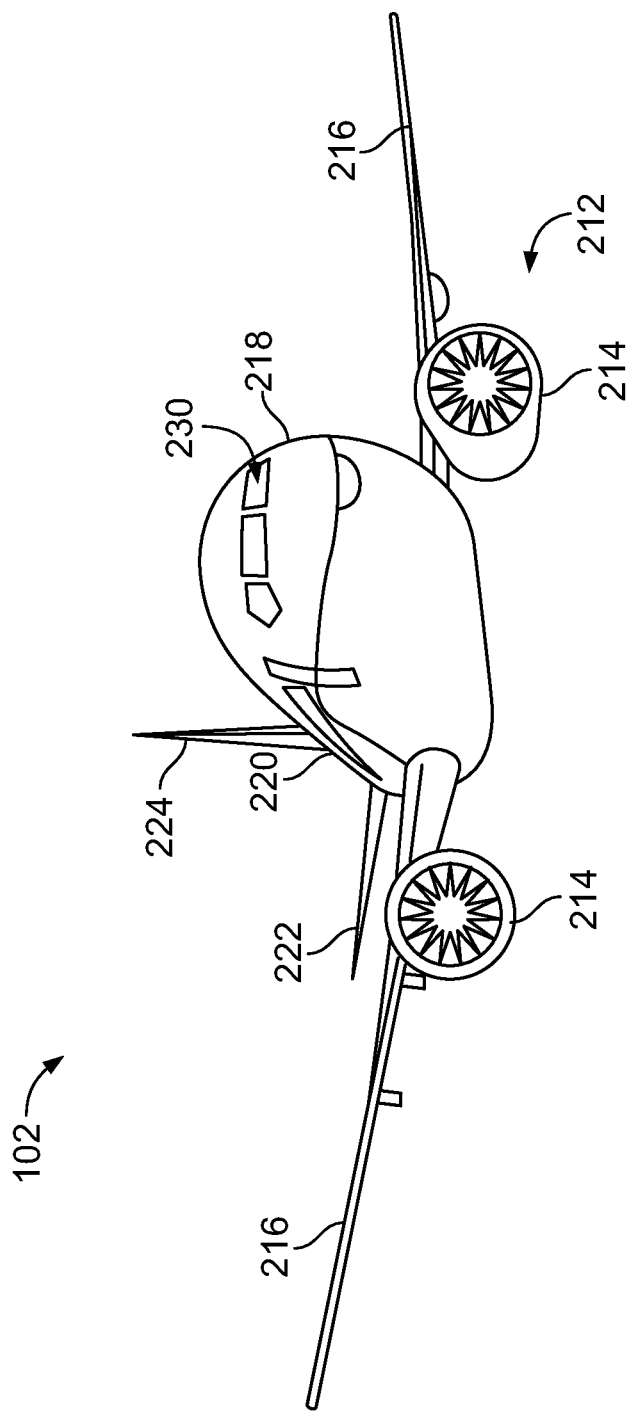
FIG. 10 illustrates a perspective front view of an aircraft, according to an example of the present disclosure.

FIG. 10 illustrates a perspective front view of an aircraft 102, according to an example of the present disclosure. The aircraft 102 includes a propulsion system 212 that includes engines 214, for example. Optionally, the propulsion system 212 may include more engines 214 than shown. The engines 214 are carried by wings 216 of the aircraft 102. In other examples, the engines 214 may be carried by a fuselage 218 and/or an empennage 220. The empennage 220 may also support horizontal stabilizers 222 and a vertical stabilizer 224. The fuselage 218 of the aircraft 102 defines an internal cabin 230, which includes a flight deck or cockpit, one or more work sections (for example, galleys, personnel carry-on baggage areas, and the like), one or more passenger sections (for example, first class, business class, and coach sections), one or more lavatories, and/or the like. FIG. 10 shows an example of an aircraft 102. It is to be understood that the aircraft 102 can be sized, shaped, and configured differently than shown in FIG. 10. Optionally, examples of the present disclosure can be used with various other vehicles. For example, instead of an aircraft, the vehicle can be a land-based vehicle, such as an automobile, a bus, a train car, or the like. As another example, the vehicle can be a watercraft. As another example, the vehicle can be a spacecraft.

Figure 11:
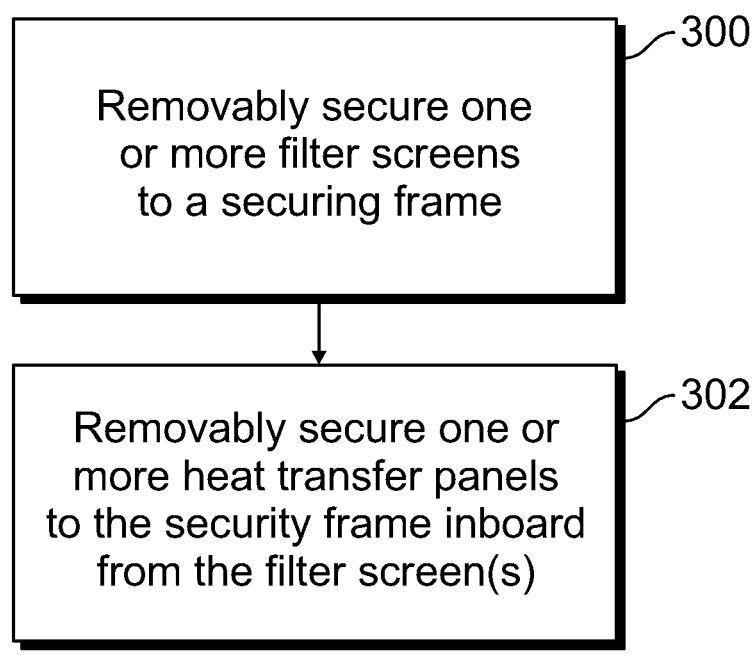
FIG. 11 illustrates a flow chart of a modular method for forming a heat exchanger system, according to an example of the present disclosure.

FIG. 11 illustrates a flow chart of a modular method for forming a heat exchanger system, according to an example of the present disclosure. Referring to FIGS. 1-11, the method includes removably securing, at 300, one or more filter screens (such as the inlet filter screen 110 and/or the outlet filter screen 114) to the securing frame 106 of the heat exchanger system 100. At 302, the method also includes removably securing one or more heat transfer panels 150 to the securing frame inboard from the filter screen(s) to form the heat transfer core 118. The heat transfer panels 150 are inboard in that they are not outside of the filter screen(s). In this manner, the filter screen(s) protect the heat transfer core 118 from foreign object debris and corrosion. Further, the filter screen(s) can be removed from the securing frame 106, such as to clean and/or replace.

Further, the disclosure comprises examples according to the following clauses:

Clause 1. A heat exchanger system, comprising:
a securing frame;
a heat transfer core secured to the securing frame; and
one or more filter screens secured to the securing frame at one or both of an inlet end or an outlet end, wherein the heat transfer core is disposed between the inlet end and the outlet end.

Clause 2. The heat exchanger system of Clause 1, wherein the heat transfer core comprises heat transfer panels.

Clause 3. The heat exchanger system of Clause 2, wherein the heat transfer panels are removably coupled to the securing frame.

Clause 4. The heat exchanger system of any of Clauses 2-3, wherein the heat transfer panels comprise fluid passages in fluid communication to form a fluid circuit that extends between a fluid inlet and a fluid outlet.

Clause 5. The heat exchanger system of any of Clauses 2-4, wherein the heat transfer panels comprise heat transfer fins separated by fluid channels.

Clause 6. The heat exchanger system of any of Clauses 2-5, wherein each of the heat transfer panels comprises a plurality of segment modules removably coupled together.

Clause 7. The heat exchanger system of any of Clauses 2-6, wherein the heat transfer panels are devoid of guard fins.

Clause 8. The heat exchanger system of any of Clauses 1-7, wherein the one or more filter screens are removably coupled to the securing frame.

Clause 9. The heat exchanger system of any of Clauses 1-8, wherein the one or more filter screens comprise a protective barrier within a protective opening.

Clause 10. The heat exchanger system of Clause 9, wherein the protective barrier comprises rigid cross beams spaced apart by openings.

Clause 11. The heat exchanger system of Clause 10, wherein the protective barrier further comprises a wire mesh screen extending between the rigid cross beams.

Clause 12. The heat exchanger system of Clauses 10 or 11, wherein the protective barrier further comprises columns that intersect the rigid cross beams.

Clause 13. The heat exchanger system of any of Clauses 1-12, wherein the one or more filter screens comprise an inlet filter screen at the inlet end.

Clause 14. The heat exchanger system of Clause 13, wherein the one or more filter screens further comprise an outlet filter screen at the outlet end.

Clause 15. The heat exchanger system of any of Clauses 1-14, wherein the one or more filter screens are spaced apart from the heat transfer core.

Clause 16. The heat exchanger system of any of Clauses 1-15, wherein the heat exchanger system is in fluid communication with a RAM air cooling system of an aircraft.

Clause 17. An aircraft comprising:
a RAM air cooling system; and
a heat exchanger system in fluid communication with the RAM air cooling system, the heat exchanger system comprising:
a securing frame;
a heat transfer core secured to the securing frame, wherein the heat transfer core comprises heat transfer panels removably coupled to the securing frame, and wherein the heat transfer panels comprise heat transfer fins separated by fluid channels, and fluid passages in fluid communication to form a fluid circuit that extends between a fluid inlet and a fluid outlet; and
one or more filter screens removably secured to the securing frame at one or both of an inlet end or an outlet end, wherein the heat transfer core is disposed between the inlet end and the outlet end, and wherein the one or more filter screens comprises a protective barrier within a protective opening.

Clause 18. The aircraft of Clause 17, wherein each of the heat transfer panels comprises a plurality of segment modules removably coupled together.

Clause 19. The aircraft of Clauses 17 or 18, wherein the one or more filter screens are spaced apart from the heat transfer core.

Clause 20. A method for a heat exchanger system, the method comprising:
removably securing heat transfer panels of a heat transfer core to a securing frame; and
removably securing one or more filter screens to the securing frame at one or both of an inlet end or an outlet end, wherein the heat transfer core is disposed between the inlet end and the outlet end.

Clause 21. The method of Clause 20, wherein each of the heat transfer panels comprises a plurality of segment modules removably coupled together.

As described herein, examples of the present disclosure provide heat exchanger systems that are less susceptible to corrosion, particularly at inlets. Further, examples of the present disclosure provide heat exchanger systems that guard against foreign object debris. Additionally, examples of the present disclosure provide heat exchanger systems that can be quickly and easily modified, instead of being replaced.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A heat exchanger system, comprising:
   a securing frame;
   a heat transfer core removably secured to the securing frame, wherein the heat transfer core comprises heat transfer panels removably coupled to the securing frame, wherein a size and shape of the heat transfer core is selectively changeable, and wherein each of the heat transfer panels comprises:
      fluid passages in fluid communication to form a fluid circuit that extends between a fluid inlet and a fluid outlet; and
      heat transfer fins separated by fluid channels; and
   one or more filter screens secured to the securing frame at one or both of an inlet end or an outlet end, wherein the heat transfer core is disposed between the inlet end and the outlet end.

2. The heat exchanger system of claim 1, wherein each of the heat transfer panels further comprises a plurality of segment modules removably coupled together.

3. The heat exchanger system of claim 2, wherein each of the plurality of segment modules is configured to removably stack onto another of the plurality of segment modules via removably couplings.

4. The heat exchanger system of claim 1, wherein the heat transfer panels are devoid of guard fins.

5. The heat exchanger system of claim 1, wherein the one or more filter screens are removably coupled to the securing frame.

6. The heat exchanger system of claim 1, wherein the one or more filter screens comprise a protective barrier within a protective opening.

7. The heat exchanger system of claim 6, wherein the protective barrier comprises rigid cross beams spaced apart by openings.

8. The heat exchanger system of claim 7, wherein the protective barrier further comprises a wire mesh screen extending between the rigid cross beams.

9. The heat exchanger system of claim 7, wherein the protective barrier further comprises columns that intersect the rigid cross beams.

10. The heat exchanger system of claim 1, wherein the one or more filter screens comprise an inlet filter screen at the inlet end.

11. The heat exchanger system of claim 10, wherein the one or more filter screens further comprise an outlet filter screen at the outlet end.

12. The heat exchanger system of claim 1, wherein the one or more filter screens are spaced apart from the heat transfer core.

13. The heat exchanger system of claim 1, wherein the heat exchanger system is in fluid communication with a RAM air cooling system of an aircraft.

14. The heat exchanger system of claim 1, wherein the heat transfer core and the one or more filter screens are slidably secured to slots of the securing frame.

15. The heat exchanger system of claim 1, wherein the securing frame comprises a coupling wall having coupling portions configured to receive and removably retain one or more portions of the one or more filter screens and the heat transfer core.

16. The heat exchanger system of claim 15, wherein the coupling wall comprises a fluid manifold configured to fluidly couple with one or more fluid couplers of the heat transfer core.

17. An aircraft comprising:
   a RAM air cooling system; and
   a heat exchanger system in fluid communication with the RAM air cooling system, the heat exchanger system comprising:
      a securing frame;
      a heat transfer core removably secured to the securing frame, wherein the heat transfer core comprises heat transfer panels removably coupled to the securing frame, wherein a size and shape of the heat transfer core is selectively changeable, and wherein the heat transfer panels comprise heat transfer fins separated by fluid channels, and fluid passages in fluid communication to form a fluid circuit that extends between a fluid inlet and a fluid outlet; and
      one or more filter screens removably secured to the securing frame at one or both of an inlet end or an outlet end, wherein the heat transfer core is disposed between the inlet end and the outlet end, and wherein the one or more filter screens comprises a protective barrier within a protective opening.

18. The aircraft of claim 17, wherein each of the heat transfer panels further comprises a plurality of segment modules removably coupled together.

19. The aircraft of claim 17, wherein the one or more filter screens are spaced apart from the heat transfer core.

20. A method for a heat exchanger system, the method comprising:
   removably securing heat transfer panels of a heat transfer core to a securing frame, wherein each of the heat transfer panels comprises a plurality of segment modules removably coupled together; and
   removably securing one or more filter screens to the securing frame at one or both of an inlet end or an outlet end, wherein the heat transfer core is disposed between the inlet end and the outlet end.

21. The method of claim 20, wherein a size and shape of the heat transfer core is selectively changeable.

\* \* \* \* \*